Figure 1:
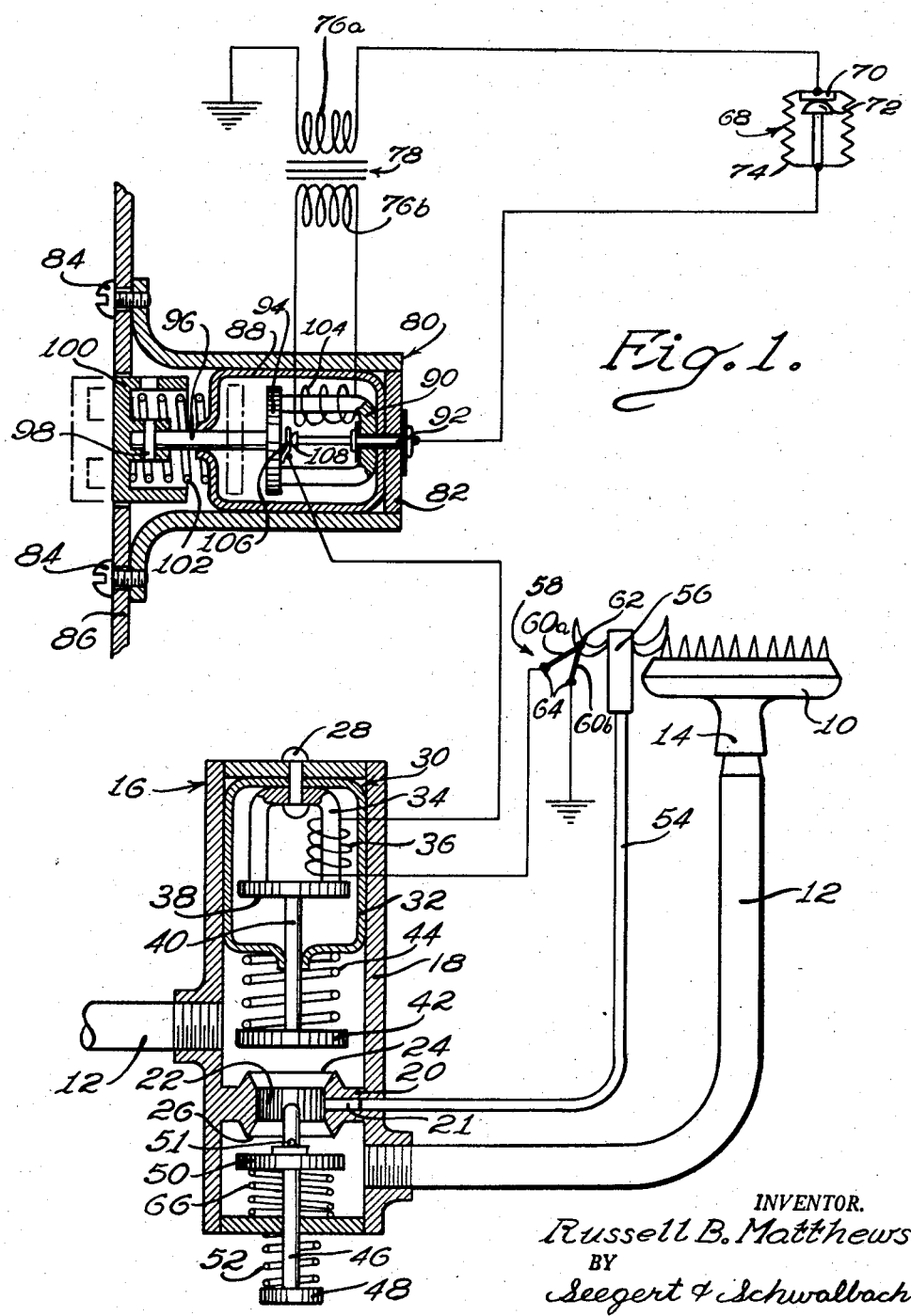

March 3, 1959 R. B. MATTHEWS 2,875,822
CONTROL AND INDICATING SYSTEM
Filed Oct. 12, 1954 2 Sheets-Sheet 1

INVENTOR.
Russell B. Matthews
BY
Seegert & Schwalbach
Attys

March 3, 1959    R. B. MATTHEWS    2,875,822
CONTROL AND INDICATING SYSTEM
Filed Oct. 12, 1954    2 Sheets-Sheet 2

INVENTOR.
Russell B. Matthews
BY
Seegert & Schwalbach
Attys

United States Patent Office 2,875,822
Patented Mar. 3, 1959

2,875,822

CONTROL AND INDICATING SYSTEM

Russell B. Matthews, Wauwatosa, Wis., assignor to Baso Inc., Milwaukee, Wis., a corporation of Wisconsin Application October 12, 1954, Serial No. 461,786

13 Claims. (Cl. 158—122)

This invention relates to control systems and indicating means therefor, and more particularly to systems including a control device actuatable in response to a plurality of conditions and having means operable on actuation of said device to indicate which of said conditions said device has responded to.

It is very desirable, particularly in fluid fuel burning apparatus, to provide control systems responsive to several conditions and in which a single control device responds to the various conditions, so that a single control device will suffice for control of the system upon the occurrence of any of the several different conditions. By way of example, for reasons of safety it is necessary to shut-off all of the fuel flow whenever the ignition means is inoperative or whenever the highest permissible safe temperature of the medium being heated has been exceeded. To accomplish both of these functions in a convenient and inexpensive manner, it is desirable to employ a single fuel flow control device which will respond to either or both of the aforementioned conditions to shut off all the fuel flow. Since each of such conditions causes actuation of the flow control device in the same way, it is difficult to determine with certainty which of such conditions has caused actuation of the flow control device once it is discovered that all of the fuel flow has been shut off. Since it may be necessary to exercise certain precautions depending upon which of such conditions has occurred, it is desirable to employ an indicating device which will permit the operator or serviceman to identify the condition which has caused the flow control device to shut off the gas flow.

It is therefore an object of this invention to provide an improved indicating device capable of distinguishing between response of the system, and more particularly the fuel flow control device, to the several conditions to thereby indicate which of said conditions has caused the fuel flow control device to be actuated.

Another object of this invention is to provide an improved indicating device which is sensitive to the rate of change of current flow in an electric circuit, which current flow is responsive to any one of several conditions, but which conditions change such current flow at different rates, thus enabling said indicating device to identify which of the conditions has occurred.

Another object is to provide an indicating device of the character described which is sensitive only to rapid changes in electric current flow therethrough.

Another object of this invention is to provide an indicating device capable of distinguishing between decay of current flow to a control device as caused by cooling of a thermoelectric generator, and interruption of the thermoelectric circuit as caused by opening of an electric switch therein.

A more specific object is the provision of a control system having an electromagnetic safety shut-off control device energized by a thermocouple and including in circuit therewith a high limit switch and indicating device, the latter being responsive to deenergization of said safety-shut-off control device by virtue of opening of said high limit switch only, said indicating device being non-responsive to deenergization of said safety shut-off as caused by cooling of the thermocouple; termination of fuel flow by said safety shut-off together with response thereto by said indicating device identifying deenergization of the safety shut-off in response to opening of said high limit switch, whereas termination of said fuel flow without response thereto by said indicating device identifying deenergization of the safety shut-off in response to cooling of the thermocouple.

Another more specific object of this invention is to provide a control system including a control circuit which when energized charges a capacitor, the charge on said capacitor being dissipated through an indicating device at different rates depending upon which of two conditions has caused actuation of the safety shut-off device, said indicating device differentiating between such different rates to thereby provide indication of the occurrence of one or the other of said two conditions.

Another more specific object of this invention is the provision of a control system having a circuit including a transformer and an electrically operated indicating device, said circuit in response to one condition operating to effect gradual diminution of current flow through said transformer while in response to the other of said conditions effecting rapid diminution of electric current flow through said transformer; said transformer effecting current flow in said electrically operated indicating device only when the current flow through the transformer primary is rapidly diminished, thereby affording indication as to which of said conditions the circuit has responded.

Another more specific object is to provide indicating apparatus of the character described having interlock means for preventing resetting of an electromagnetic flow control device unless the indicating device has been pre-set so as to be capable of affording indication of occurrence of a given condition.

Another more specific object is to provide a control apparatus having an electromagnetic flow control device and a resettable indicating device having electrical contacts in series circuit arrangement with said electromagnetic flow control device so that the latter cannot be energized unless the electrical contacts are closed by virtue of the resetting of said indicating device.

The novel features which I consider characteristic of my invention are set forth with particularity in the appended claims. The apparatus itself, however, both as to its organization and mode of operation, together with additional objects and advantages thereof, will best be understood from the following description of specific embodiments when read in connection with the accompanying drawings, in which, Figure 1 shows a first embodiment of the control and indicating apparatus more or less schematically and partly in section.

Figure 2:
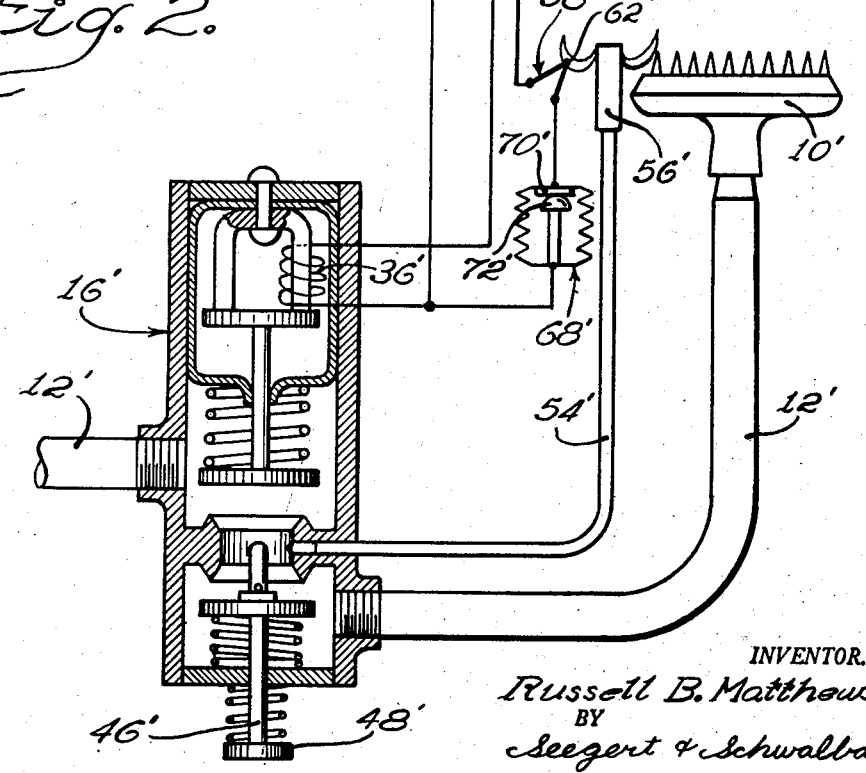

Figure 2 shows a second embodiment of the control and indicating apparatus, more or less schematically and partly in section.

Referring to Figure 1 of the drawings, it shows a main burner 10 which may be for use in a room or space heater, or for use in a water heater, a floor furnace, an oven burner, one or more stove top burners, or for use in any other suitable fluid fuel burning device. A fuel supply conduit 12 leads to main burner 10 for delivery of gaseous or other fuel thereto, for example, through a mixing chamber 14 through which air is admitted through adjustable inlets (not shown), as is well understood in the art. Electric control means in the form of a safety shut-off fuel flow control device designated in its entirety at 16 is interposed in the fuel supply conduit 12 for control of the fuel supplied to said main burner 10 as will hereinafter appear.

Such safety shut-off device 16 has a main body 18 formed with a partition 20 having a through opening 22 and providing on its opposite sides valve seats 24 and 26. Positioned within said main body 18 and attached to one end thereof as by means of a rivet 28, is an electromagnet assembly 30. Said assembly 30 comprises an enclosure 32 within which is secured as by means of said rivet 28, a core member 34 having an electromagnet winding 36. An armature 38 is positioned within said enclosure 32 for cooperation with said core member 34, and has attached thereto for slidable movement within an opening in one end of said enclosure 32, a valve stem 40 having a valve or control member 42 affixed thereto for cooperation with said valve seat 24. Interposed between said enclosure 32 and said valve member 42, is a compression spring 44 for biasing the valve member 42 toward the valve seat 24 and the armature 38 away from the pole faces of the electromagnet core 34. The armature 38 and valve member 42 are movable between the operating or energized position thereof shown in Figure 1 and a deenergized or safety position (not shown) wherein the valve member 42 is seated on seat 24 and armature 38 is retracted from the pole faces of the electromagnet core 34 under the bias of spring 44.

Slidably positioned within an opening in the opposite end wall of said main body 18 is a manually operable reset stem 46. Said reset stem 46 is formed with an enlarged end portion 48 for convenience of the operator in effecting resetting operation.

A valve member 50 is slidably positioned on said reset stem 46 within said main body 18 for cooperation with said valve seat 26 in response to movement of said reset stem 46. Such slidable positioning is effected by means of pin 51 press-fitted within an opening in reset stem 46 and compression spring 66 interposed between valve member 50 and the end wall of main body 18. Interposed between said main body portion end wall and said enlarged end portion 48 is a compression spring 52 for return of said reset stem 46 to its released position.

An aperture 21 is provided in the side wall of said main body 18. One end of a pilot fuel supply conduit 54 is attached to main body 18 in communication with said aperture 21 while the other end thereof has a pilot burner 56 juxtaposed with respect to said main burner 10 to afford ignition of the fuel emitted from said main burner 10.

Condition responsive electric energy source means is provided in the form of a thermocouple 58 formed of dissimilar metals 60a and 60b providing a hot junction 62 and a pair of cold junctions 64. One terminal of the thermocouple 58 is grounded as shown and the other terminal is connected in circuit with one end of the aforementioned electromagnet winding 36. The hot junction 62 of the thermocouple 58 is positioned to be subjected to the flame of the pilot burner 56 and normally affords sufficient power for energization of the winding 36. On occurrence of a first predetermined condition such as pilot burner flame outage, however, the resultant cooling of the hot junction 62 causes gradual diminution of the current output of the thermocouple 58. The other end of said winding 36 is connected in circuit with contacts 106 and 108 of an indicating device 80 and with a condition responsive circuit controlling device 68 capable of effecting substantially instantaneous diminution of electric current flow in said winding 36. I prefer to employ a temperature responsive switch 68 having relatively movable normally closed electrical contacts 70 and 72 positioned within an expansible and contractible enclosure or bellows 74. The enclosure or bellows 74 of the switch 68 shown in the drawings preferably contains a volatile fluid fill. The contact 70 of switch 68 is connected to ground through the primary winding 76a of a transformer 78 to complete a main circuit comprising the thermocouple 58, electromagnet winding 36, switch contacts 106 and 108, switch 68 and transformer primary 76a.

The switch 68 is positioned in a heating zone, so that with contacts 106 and 108 of device 80 in their relatively closed position, occurrence of a predetermined second condition such as a high limit temperature condition within such zone will effect expansion of bellows 74 and separation of contacts 70 and 72 so as to substantially instantaneously interrupt the current flow to electromagnet winding 36. As will become apparent from a further and more complete understanding of the present invention, switch 68 need not be of the specific form shown in the present drawings, and further, it need not necessarily be responsive to temperature changes, but may be sensitive to any desired condition.

A secondary winding 76b of said transformer 78 is connected in circuit with the indicating device 80 to provide an auxiliary circuit therewith. Such indicating device 80 is formed with a frame 82 for attachment of the device to a panel board or the like, as by means of screws 84. Said device further includes a magnetic structure comprising an enclosure 88 within which a substantially U-shaped permanent magnet core 90 is fastened as by means of member 92. Said member 92, in addition to providing such fastening means also provides contact 108. Movably positioned within said enclosure 88 is an armature 94 for cooperation with the pole faces of said core 90. Electrical contact 106 is attached to armature 94 and cooperates with contact 108 upon movement of the armature between attracted and retracted relative positions. A reset stem 96 having sliding movement in an opening formed in one end of said enclosure 88 has one of its ends secured to said armature 94.

Fixed to the other end of said reset stem 96, as by means of pin 98, is an indicator member 100 having sliding movement within an opening in the panel to permit resetting of armature 94 with respect to core member 90 and to provide visual indication as to whether said indicating device is in its reset or released position. Interposed between enclosure 88 and indicator member 100 is a compression spring 102 biasing said indicator member to its released position and the armature 94 to its retracted position. Core member 90 is a permanent magnet of such strength as to be capable of overcoming the force of compression spring 102 so as to maintain armature 94 in attracted position following resetting thereof.

Positioned about one leg of said magnet core 90 and in circuit with the secondary winding 76b of transformer 78, is an electromagnet winding 104 polarized with respect to the permanent magnet so that on energization thereof it is capable of depolarizing said magnet and neutralizing the effects thereof on armature 94, thereby initiating movement of armature 94 to its released position under the influence of spring 102.

The operation of the embodiment shown in Figure 1 is as follows:

In order to light the main burner 10 it is first necessary to manually depress indicator member 100 and reset stem 96 of indicating device 80 to move armature 94 into cooperative engagement with permanent magnet core 90. Such movement of armature 94 with respect to core 90 causes contacts 106 and 108 to be placed in closed position thus setting up the energizing circuit for electromagnet winding 36. It is believed readily apparent to those skilled in the art that contacts 106 and 108 thus act as interlock means in that they prevent resetting of safety shut-off device 16 prior to resetting of indicating device 80. It is believed equally apparent that a mechanical interlock arrangement may be employed instead of electrical contacts 106 and 108 if devices 16 and 80 are positioned in proximity to each other to permit of a mechanical interlock between reset stem 46 and indicator member 100.

Reset stem 46 may then be manually depressed to move valve member 42 from seating engagement with valve seat 24 to permit flow of fuel to pilot burner 56 through conduit 54. Such movement of stem 46 moves armature 38 into reset position with respect to electromagnet core member 34, so that subsequent energization of electromagnet winding 36, due to generation of electric energy by heating of thermocouple 58 by the pilot burner 56, maintains said armature 38 in its attracted position and valve member 42 in its flow-permitting operating position. Such resetting movement also effects seating engagement of valve member 50 with valve seat 26 thus preventing fuel flow to the main burner 10 during the resetting operation, in a manner well known in the art. The fuel emitted from the pilot burner 56 may be ignited in any well known manner. Following ignition of pilot burner fuel and holding of armature 38 in its attracted position, release of reset stem 46 moves valve member 50 out of seating engagement with valve seat 26, thereby permitting flow of fuel to main burner 10. Such fuel flow to main burner 10 is then ignited by the pilot flame.

The electrical energy generated by thermocouple 58 is caused to flow from thermocouple 58 through winding 36, contacts 106 and 108, contacts 70 and 72, and transformer primary winding 76a. It is thus seen that valve member 42 is maintained in its open or operating position as long as current flows in this circuit, but if such current flow is interrupted by occurrence of one or another of the aforementioned first and second predetermined conditions causing separation of contacts 70 and 72 or cooling of thermocouple 58, electromagnet 30 will become deenergized to effect movement of valve 42 to its closed or safety position under the influence of spring 44. Should such valve movement be a result of cooling of thermocouple 58 as caused by extinguishment of the pilot flame, the current flow in the main circuit will not diminish abruptly but will gradually decay at a rate determined by the rate of cooling of the thermocouple 58. On the other hand, if such valve movement should be caused by separation of contacts 70 and 72 in response, for example, to a high limit temperature condition, the diminution of the current flow in the main circuit producing such movement is substantially instantaneous. The instantaneous interruption or gradual decay of current flow through winding 36, whichever takes place, will also be realized in primary winding 76a of transformer 78. A gradual decay of the main circuit current causes little or no current flow to be induced in secondary winding 76b of transformer 78, thereby permitting the permanent magnet to maintain indicator member 100 in its reset position.

If, on the other hand, the current flow through transformer 76a is substantially instantaneously interrupted as by means of separation of contacts 70 and 72, a relatively large current flow will be induced in secondary winding 76b because of the high rate of change of current flow through primary winding 76a. Such large current flow in winding 76b causes electromagnet winding 104 to be energized so as to produce an electromagnetic effect which neutralizes the magnetic effect of permanent magnet 90 on armature 94, thus enabling compression spring 102 to actuate the indicator member 100 to its released position.

It is thus seen that in the event of closure of valve member 42 thereby shutting off fuel flow to pilot burner 56 and main burner 10, the operator or serviceman can quickly determine which of the two predetermined conditions to which the apparatus is responsive has effected said valve closure. That is, on shut-off of fuel flow, it is merely necessary to see whether indicator member 100 is in its reset or released position. If it has remained in its reset position, it is apparent that closure of valve member 42 was caused by cooling of thermocouple 58 due to pilot failure or the like, whereas if indicator member 100 has returned to its released position, it is apparent that contacts 70 and 72 of switch 68 have been moved to their open circuit positions in response to, for example, a high limit temperature condition.

Referring to Figure 2 of the drawings, it shows the second embodiment having a main burner 10', pilot burner 56', safety shut-off valve 16', thermocouple 58', switch 68' and indicating device 80' similar to those in Figure 1 and described above in detail. The embodiment of Figure 2 comprises a main circuit which has switch 68' in series circuit relation with electromagnet winding 36', contacts 106' and 108' and thermocouple 58'. In parallel circuit arrangement with said winding 36' is an auxiliary circuit comprising a capacitor 110 and electromagnet winding 104' of indicating device 80' which are in series arrangement with respect to each other. In all other respects the embodiment of Figure 2 is similar to that of Figure 1 and will not be described.

The operation of the embodiment shown in Figure 2 is as follows:

The pilot burner 56' and main burner 10' are ignited in the same manner as described above with regard to the embodiment of Figure 1. The voltage developed across electromagnet winding 36' due to electrical power generated by thermocouple 58' is impressed across the parallel circuit comprising winding 104' and capacitor 110 thus charging the latter. The current flow through such parallel circuit during charging of capacitor 110 is in such direction as to cause the electromagnetic effect of winding 104' to aid the permanent magnet in retaining armature 94' in its attracted position.

While the thermocouple is being heated at a steady rate, the voltage generated thereby is steady or constant thus causing the voltage across capacitor 110 to remain at a constant value. In this steady state condition, the voltage across capacitor 110 is substantially equal to the voltage across thermocouple 58'. If the pilot flame is extinguished, the voltage across thermocouple 58' will gradually decay or decrease in proportion to the rate of cooling of the hot junction 62'. As the thermocouple voltage decreases the voltage across capacitor 110 will also decrease and at a rate equal to the rate of decrease of voltage across the thermocouple. Since the decrease in thermocouple voltage actually causes the decrease in voltage across capacitor 110, the magnitude of voltage across the capacitor at any given moment during decrease thereof will be slightly greater than the magnitude of the voltage across the thermocouple. The difference between such voltages will be proportional to the rate of change of thermocouple voltage and will be impressed across winding 104' of indicating device 80'. Thus, a lower rate of change of thermocouple voltage produces less voltage across winding 104' and hence less electromagnetic force for neutralization of the permanent magnet.

If, on the other hand, electromagnet winding 36' is deenergized by virtue of opening of contacts 70' and 72', the sole source of power remaining in circuit is the charged capacitor 110. The voltage of capacitor 110 is then impressed across windings 36' and 104' in series circuit relation so that an appreciable amount of the capacitor voltage is immediately impressed across winding 104' causing a current flow therethrough of sufficient strength and in the proper direction to provide an electromagnetic effect sufficient to neutralize the permanent magnet for release of armature 94' to thereby permit compression spring 102' to return indicator member 100' to its released position.

It is thus seen that the electromagnet winding 104' is constructed relative to the permanent magnet strength to permit the higher voltage impressed thereacross due to opening of contacts 70' and 72', to release indicator member 100', whereas the smaller voltage impressed across winding 104' as occurs upon cooling of thermocouple 58' will be insufficient to overcome the permanent magnet's effect and to release indicator member 100'.

As above explained with regard to the first embodiment, the operator can, by merely noting the position of indicator member 100', quickly determine which of the two conditions has caused the safety shut-off device 16' to interrupt gas flow.

Although I have shown and described certain specific embodiments of my invention, I am aware that many modifications thereof are possible. My invention, therefore, is not to be restricted to the embodiments described and illustrated and is of the scope defined by the appended claims.

I claim:

1. In a control apparatus, in combination, a main circuit, electric control means in said main circuit, condition responsive means including a source of electric energy also in said main circuit for normally supplying a predetermined current flow to said circuit, said means supplying a gradually reducing current flow to said circuit in response to a first predetermined condition to deenergize said main circuit and electric control means, condition responsive switch means also in said main circuit operable in response to a second predetermined condition to substantially instantaneously interrupt said current flow in said main circuit and electric control means, and an auxiliary circuit inductively associated with said main circuit and comprising an electroresponsive indicating device energizable upon substantially instantaneous interruption of said current flow in said main circuit but unaffected by gradual reduction of said current flow.

2. In a control apparatus, in combination, a main circuit, electric control means in said main circuit, condition responsive means including a source of electric energy also in said main circuit for normally supplying a predetermined current flow to said circuit, said means supplying a gradually reducing current flow to said circuit in response to a first predetermined condition to deenergize said main circuit and electric control means, condition responsive switch means also in said main circuit operable in response to a second predetermined condition to substantially instantaneously interrupt said current flow in said main circuit and electric control means, and an auxiliary circuit operatively associated with said main circuit and comprising an electroresponsive indicating device and a capacitor, said capacitor being operable upon substantially instantaneous interruption of current flow in said main circuit to effect a predetermined energization of said indicating device but being ineffective to effect such energization upon gradual reduction of said current flow in said main circuit as afforded by said electroresponsive means.

3. In a control apparatus, in combination, main and pilot burners and fuel supply means therefor, electric control means for control of the fuel supply to said main burner, a thermoelectric generator in circuit with said control means and responsive to pilot flame extinguishment to gradually deenergize said control means to terminate fuel supply to said main burner, a condition responsive circuit controlling device also in circuit with said control means operable in response to a predetermined condition to substantially instantaneously interrupt energization of said control means and thereby terminate fuel supply to said main burner, and an electroresponsive indicating device associated with said control means and energizable in response to substantially instantaneous interruption of energization of said control means to afford indication of occurrence of said predetermined condition, said indicating device being substantially unaffected by gradual deenergization of said control means afforded by extinguishment of the pilot flame.

4. In a control apparatus, in combination, main and pilot burners and fuel supply means therefor, resettable electric safety shut-off means for control of fuel supply to said main and pilot burners, a source of electric energy in circuit with said safety shut-off means and responsive to pilot burner flame extinguishment to gradually deenergize said safety shut-off means to interrupt fuel flow to said main and pilot burners, a condition responsive circuit-controlling device also in circuit with said safety shut-off means operable in response to a predetermined condition to substantially instanteously interrupt energization of said safety shut-off means to actuate the latter and interrupt fuel flow to said main and pilot burners, a manually resettable electro-responsive indicating device associated with said safety shut-off means and energizable in response to substantially instantaneous interruption of energization of said safety shutoff means to afford indication of occurrence of said predetermined condition, said device being substantially unaffected by gradual deenergization of said safety shut-off means afforded by extinguishment of the pilot flame, and resettable interlock means associated with said electric shut-off means for preventing resetting of said safety shut-off means until after resetting of said indicating device.

5. In a control apparatus, in combination, main and pilot burners and fuel supply means therefor, resettable electric safety shut-off means for control of fuel supply to said main and pilot burners, a source of electric energy in circuit with said safety shut-off means and responsive to pilot burner flame extinguishment to gradually deenergize said safety shut-off means to interrupt fuel flow to said main and pilot burners, a condition responsive circuit-controlling device also in circuit with said safety shut-off means operable in response to a predetermined condition to substantially instantaneously interrupt energization of said safety shut-off means to interrupt fuel flow to said main and pilot burners, a manually resettable electro-responsive indicating device associated with said safety shut-off means energizable in response to substantially instantaneous interruption of energization of said safety shut-off means to afford indication of occurrence of said predetermined condition but substantially unaffected by gradual deenergization of said safety shut-off means as afforded by extinguishment of the pilot flame, and resettable interlock means comprising a pair of cooperating electrical contacts in circuit with said safety shut-off means and movable to circuit closed position upon resetting thereby to prevent resetting of said safety shut-off means until after resetting of said indicating device.

6. In a control apparatus, in combination, a main circuit, condition responsive means including a source of electric energy for said main circuit for normally supplying a predetermined current flow to said circuit, said means supplying a gradually reducing current flow to said circuit in response to a first predetermined condition, condition responsive circuit controlling means operatively associated with said main circuit and operable in response to a second predetermined condition to substantially instantaneously interrupt said current flow in said main circuit, and an auxiliary circuit associated with said main circuit and comprising electroresponsive means having resettable interlock means associated with said main circuit, said electroresponsive means being energizable by substantially instantaneous interruption of said current flow in said main circuit to render said main circuit incapable of return to operative condition until said interlock means has been reset.

7. In a control apparatus, in combination, a main circuit, electric control means operatively associated with said main circuit and energizable by current flow therethrough, said control means comprising a movable control member having operating and deenergized positions, condition responsive means including a source of electric energy for said main circuit normally supplying a predetermined current flow to said circuit for disposition of said control member in its operating position, said condition responsive means supplying a gradually reducing current flow to said circuit in response to a first predetermined condition to deenergize said main circuit and said electric control means and thereby effect disposition of said control member in its deenergized position, condition responsive circuit controlling means operatively associated with said main circuit and operable in response to a second predetermined condition to substantially instantaneously interrupt said current flow in said main circuit and said electric control means, and an auxiliary circuit operatively associated with said main circuit and comprising electroresponsive indicating means energizable by substantially instantaneous interruption of said current flow in said main circuit but unaffected by a gradual reduction in said current flow.

8. In a control apparatus, in combination, a main circuit, electric control means operatively associated with said main circuit and energizable by current flow therethrough, said control means comprising a movable member having operating and deenergized positions, condition responsive means including a source of electric energy for said main circuit normally supplying a predetermined current flow to said circuit for disposition of said control member in its operating position, said condition responsive means supplying a gradually reducing current flow to said circuit in response to a first predetermined condition to deenergize said main circuit and said electric control means and thereby effect disposition of said control member in its deenergized position, condition responsive circuit controlling means operatively associated with said main circuit and operable in response to a second predetermined condition to substantially instantaneously interrupt said current flow in said main circuit and said electric control means, and an auxiliary circuit operatively associated with said main circuit and comprising electroresponsive indicating means operable in response to a predetermined rate of change of current flow in said main circuit, whereby said electroresponsive means is responsive to the substantially instantaneous interruption afforded by said circuit controlling means but unaffected by the gradual deenergization afforded by said source.

9. In a control apparatus, in combination, a main circuit, electric control means in said main circuit, a flame responsive thermocouple in said main circuit for energization of said control means and operable upon flame extinguishment to gradually deenergize said main circuit and control means, a condition responsive switch operatively associated with said main circuit and operable upon occurrence of a predetermined condition to substantially instantaneously deenergize said main circuit and control means, and an auxiliary circuit operatively associated with said main circuit and comprising an electroresponsive indicating device and a capacitor, the latter of which is energized by said thermocouple, operation of said condition responsive switch effecting discharge of said capacitor through said indicating device at a rate sufficient to effect predetermined energization and actuation of the same, whereas gradual deenergization of said control means afforded by cooling of said thermocouple effects discharge of said capacitor at a rate insufficient to effect such predetermined energization and actuation of said indicating device.

10. In a control apparatus, in combination, a main circuit, electric control means in said main circuit, a flame responsive thermocouple in said main circuit for energization of said control means and operable upon flame extinguishment to gradually deenergize said main circuit and control means, a condition responsive switch operable upon occurrence of a predetermined condition to substantially instantaneously deenergize said main circuit and control means, and an auxiliary circuit inductively associated with said main circuit and comprising an electroresponsive indicating device, operation of said condition responsive switch inducing current flow in said indicating device sufficient to effect predetermined energization and actuation of the same, whereas gradual deenergization of said main circuit afforded by cooling of said thermocouple induces current flow in said electroresponsive indicating device insufficient to effect such predetermined energization and actuation thereof.

11. Control apparatus comprising an electrical circuit, means including a source of electric energy for said circuit to afford a current flow therethrough, condition responsive means operatively associated with said circuit and operable in response to a first predetermined condition to substantially instantaneously reduce the current flow in said circuit, said first-mentioned means being operable in response to a second predetermined condition to gradually reduce the current flow in said circuit, and means affording identification of which of said first and second condition is the cause of a reduction in the current flow in said circuit comprising rate of current change sensitive means operatively associated with said circuit and having indicating means movable to an indicating position in response to the rate of current change effected by the occurrence of one of said first and second predetermined conditions only.

12. In a control apparatus, in combination, an electric circuit, means including a source of electric energy for said circuit to afford a current flow therethrough, electric control means energized by current flow through said circuit, circuit controlling means operable in response to a first condition to substantially instantaneously decrease the current flow in said circuit for deenergization and actuation of said electric control means, said first mentioned means being responsive to a second condition to gradually reduce the current flow in said circuit for deenergization and actuation of said electric control means, and indicating means associated with said circuit and including means sensitive to the rate of change of current in said circuit to afford indication of occurrence of one of said given conditions only.

13. In a control apparatus, in combination, a main circuit, condition responsive means including a source of electric energy for said main circuit for normally supplying a predetermined current flow to said circuit, said means supplying a gradually reducing current flow to said circuit in response to a first predetermined condition, condition responsive circuit controlling means operatively associated with said main circuit and operable in response to a second predetermined condition to substantially instantaneously interrupt said current flow in said main circuit, and an auxiliary circuit associated with said main circuit comprising electroresponsive means operable in response to a predetermined rate of change of current flow in said main circuit and including resettable circuit controlling interlock means associated with said main circuit, whereby said electroresponsive means is energizable in response to the occurrence of one of said first and second predetermined conditions to cause said interlock means to render said main circuit inoperative and maintain the same inoperative until said interlock means has been reset.

References Cited in the file of this patent
UNITED STATES PATENTS

| | | |
|---|---|---|
| 2,312,479 | Ray | Mar. 2, 1943 |